United States Patent [19]
Li et al.

[11] Patent Number: 5,480,706
[45] Date of Patent: Jan. 2, 1996

[54] FIRE RESISTANT BALLISTIC RESISTANT COMPOSITE ARMOR

[75] Inventors: Hsin L. Li, Parsippany; Young D. Kwon, Mendham; Dusan C. Prevorsek, Morristown, all of N.J.

[73] Assignee: AlliedSignal Inc., Morris Township, N.J.

[21] Appl. No.: 260,661

[22] Filed: Jun. 16, 1994

Related U.S. Application Data

[63] Continuation of Ser. No. 71,868, Jun. 2, 1993, abandoned, which is a continuation of Ser. No. 755,231, Sep. 5, 1991, abandoned.

[51] Int. Cl.$^6$ ............................ B32B 5/12; B32B 7/00; B27N 9/00
[52] U.S. Cl. .................... 428/113; 428/229; 428/236; 428/237; 428/251; 428/252; 428/285; 428/286; 428/294; 428/295; 428/902; 428/911; 428/920
[58] Field of Search .............................. 428/902, 294, 428/251, 252, 285, 113, 229, 236, 237, 286, 295, 911, 920

[56] References Cited

U.S. PATENT DOCUMENTS

| | | | |
|---|---|---|---|
| 3,486,966 | 12/1969 | Allen et al. | 428/252 |
| 3,516,890 | 6/1970 | Gallistel | 156/505 |
| 3,916,060 | 10/1975 | Fish et al. | 428/911 |
| 4,403,012 | 9/1983 | Harpell et al. . | |
| 4,413,110 | 11/1983 | Kavesh et al. . | |
| 4,457,985 | 7/1984 | Harpell et al. . | |
| 4,543,286 | 9/1985 | Harpell et al. . | |
| 4,550,044 | 10/1985 | Rosenberg et al. | 428/911 |
| 4,574,105 | 3/1986 | Donovan | 428/252 |
| 4,613,535 | 9/1986 | Harpell et al. | 428/902 |
| 4,623,574 | 11/1986 | Harpell et al. | 428/902 |
| 4,650,710 | 3/1987 | Harpell et al. . | |
| 4,681,792 | 7/1987 | Harpell et al. . | |
| 4,737,401 | 4/1988 | Harpell et al. . | |
| 4,737,402 | 4/1988 | Harpell et al. . | |
| 4,748,064 | 5/1988 | Harpell | 428/113 |
| 4,836,084 | 6/1989 | Hallal | 428/251 |
| 4,868,040 | 9/1989 | Vogelesang et al. | 89/36.02 |
| 4,879,165 | 11/1989 | Smith | 428/911 |
| 4,916,000 | 4/1990 | Li et al. . | |

OTHER PUBLICATIONS

J. Macromol. Sci.–Chem., A7(1), pp. 295–322 (1973), R. C. Laible and F. Figucia.

*Primary Examiner*—James D. Withers
*Attorney, Agent, or Firm*—John E. Thomas; Melanie L. Brown

[57] ABSTRACT

This invention relates to a fire resistant multilayer complex ballistic resistant article comprising at least one first layer comprised a plurality of flammable fibers a first matrix and at least one second layer which is adjacent to said first layer which comprises a plurality of fire resistant fibers in a second matrix, wherein the second matrix comprises a fire retardant material and is different from the first matrix material.

31 Claims, 1 Drawing Sheet

FIRE RESISTANT BALLISTIC RESISTANT COMPOSITE ARMOR

This application is a continuation of application Ser. No. 08/071,868 filed Jun. 2, 1993, which is a continuation of Ser. No. 07/755,231 filed on Sep. 5, 1991, both now abandoned.

BACKGROUND OF THE INVENTION

1. Field of the Invention

This invention relates to ballistic resistant composite articles. More particularly, this invention relates to such articles having improved flame resistant protection.

2. Prior Art

Ballistic articles such as bulletproof vests, helmets, structural members of helicopters and other military equipment, vehicle panels, briefcases, raincoats, parachutes, and umbrellas containing high strength fibers are known. Fibers conventionally used include aramid fibers such as poly (phenylenediamine terephthalamide), graphite fibers, nylon fibers, ceramic fibers, glass fibers and the like. For many applications, such as vests or parts of vests, the fibers are used in a woven or knitted fabric. For many of the applications, the fibers are encapsulated or embedded in a matrix material.

In "The Application of High Modulus Fibers to Ballistic Protection", R.C. Liable et al , J. Macromol. Sci.-Chem. A7(1), pp. 295– 322, 1973, it is indicated on p. 298 that a fourth requirement is that the textile material have a high degree of heat resistance. In an NTIS publication, AD-A018 958 "New Materials in Construction for Improved Helmets", A. L. Alesi et al., a multilayer highly oriented polypropylene film material (without matrix), referred to as "XP", was evaluated against an aramid fiber (with a phenolic/polyvinyl butyral resin matrix). The aramid system was judged to have the most promising combination of superior performance and a minimum of problems for combat helmet development. U.S. Pat. Nos. 4,403,012 and 4, 457,985 disclose ballistic resistant composite articles comprised of networks of high molecular weight polyethylene or polypropylene fibers, and matrices composed of olefin polymers and copolymers, unsaturated polyester resins, epoxy resins, and other resins curable below the melting point of the fiber.

A. L. Lastnik, et al., "The Effect of Resin concentration and Laminating Pressures on KEVLAR Fabric Bonded with Modified Phenolic Resin", Tech. Report NATICK/TR-84/ 030, Jun. 8, 1984; disclose that an interstitial resin, which encapsulates and bonds the fibers of a fabric, reduces the ballistic resistance of the resultant composite article.

U.S. Pat. Nos. 4,623,574 and 4,748,064 disclose a simple composite structure exhibits outstanding ballistic protection as compared to simple composites utilizing rigid matrices, the results of which are disclosed in the patents. Particularly effective are weight polyethylene and polypropylene such as disclosed in U.S. Pat. No. 4,413,110.

U.S. Pat. Nos. 4,737,402 and 4,613,535 disclose complex rigid composite articles having improved impact resistance which comprise a network of high strength fibers such as the ultra-high molecular weight polyethylene and polypropylene disclosed in U.S. Pat. No. 4,413,110 embedded in an elastomeric matrix material and at least one additional rigid layer on a major surface of the fibers in the matrix. It is disclosed that the composites have improved resistance to environmental hazards, improved impact resistance and are unexpectedly effective as ballistic resistant articles such as armor.

U.S. Pat. No. 3,516,890 disclosed an armor plate composite with multiple-hit capability. U.S. Pat. No. 4,836,084 discloses an armor plate composite composed of four main components, a ceramic impact layer for blunting the tip of a projectile, a sub-layer laminate of metal sheets alternating with fabrics impregnated with a viscoelastic synthetic material for absorbing the kinetic energy of the projectile by plastic deformation and a backing layer consisting of a pack of impregnated fabrics. It is disclosed that the optimum combination of the four main components gives a high degree of protection at a limited weight per unit of surface area.

U.S. Pat. No. 4,681,792 discloses flexible articles of manufacture comprising a first portion which comprises a plurality of first flexible layers arranged, each with layers consisting essentially of fibers having a tensile modulus of at least about 300 g/denier, and a tenacity of at least about 15 g/denier and a plurality of second layers comprising fibers.

U.S. Pat. No. 4,732,803 discloses light weight armor comprising lamina-like structures arranged with zones of decreasing Young's modulus and increasing elongation characteristics. The structure contains at least one composite having fibers arranged to dissipate impact forces laterally.

SUMMARY OF THE INVENTION

This invention relates to a fire resistance multilayer complex ballistic resistant article comprising:

one or more first layers comprising a network of flammable polymeric fibers in a matrix, such as fibers composed of polymers or copolymers formed by the polymerization of $\alpha,\beta$ -unsaturated monomers of the formula:

$$R_1R_2-C=CH_2$$

wherein:

$R_1$ and $R_2$ are the same or different and are hydrogen, hydroxy, halogen, alkylcarbonyl, carboxy, alkoxycarbonyl, heterocycle or alkyl or aryl either unsubstituted or substituted with one or more substituents selected from the group consisting of alkoxy, cyano, hydroxy, alkyl and aryl or a mixture of such fibers said fibers having a tenacity of at least about 7 g/denier, a tensile modulus of at least about 150 g/denier and an energy-to-break of at least about 8 joules/ grams; and one or more second layers comprising a network of fire resistant organic or inorganic fibers in a matrix, said fibers having a tenacity of at least about 7 g/denier, a tensile modulus of at least about 160 g/denier and an energy-to-break of at least about 8 joules/grams, said first and second layers distributed through said article in an alternating or substantially alternating fashion.

The ballistic resistant armor of this invention exhibits several unique advantages. The armor exhibits outstanding ballistic resistance. Moreover, the ballistic armor is fire resistant. As used herein, fire resistance is measured according to the Torch Test. In this test, the flammability of a test sample of a thickness of ¼ in. and a size which is adequate to cover the flame of a propane cylinder (usually at least about 12 in. by 12 in.) is evaluated. The propane burner is placed on a surface and the test sample is positioned horizontally so that the blue cone of the flame touches the surface of the sample perpendicularly. The sample is contacted with the surface of the sample for a period of from about 30 seconds to about 60 seconds and then is removed.

Observations are made regarding the self extinguishing time of the flame. The self extinguishing time is the the total time, in seconds, that the specimen flames after the removal of the ingnition source. As used herein, "fire resistant" means that the composite has a self extinguishing time equal to or less than about 20 seconds, preferably equal to or less than about 10 seconds, more preferably, equal to or less than about 5 seconds and most preferably equal to or less than about 2 seconds.

BRIEF DESCRIPTION OF THE DRAWINGS

The invention will be more fully understood and further advantages will become apparent when reference is made to the following detailed description of the invention and the accompanying drawings in which.

DETAILED DESCRIPTION OF THE INVENTION

Figure 1:
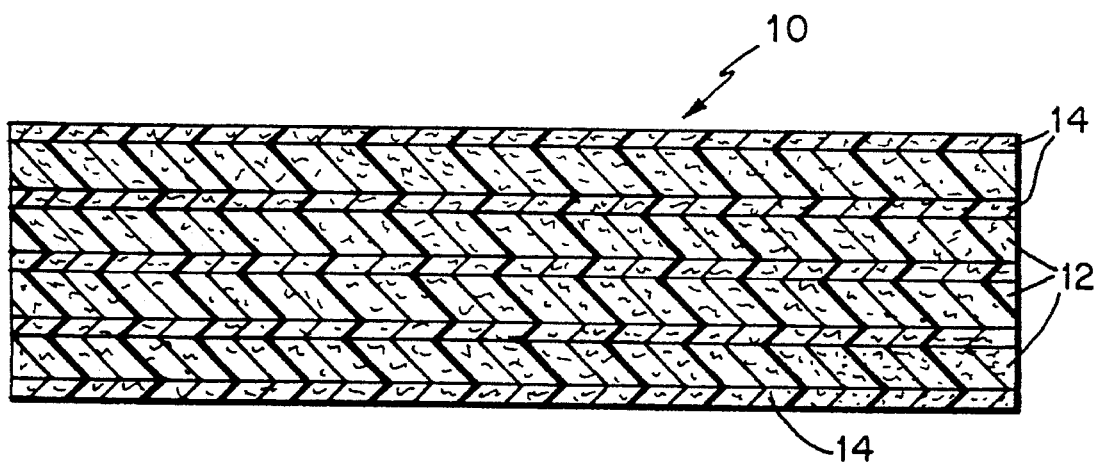
FIG. 1 is a prospective fragmentary view of a ballistic resistant article according to this invention showing its essential elements of one or more first layers and one or more second layers.

The present invention will be better understood by those of skill in the art by reference to the above figures. Referring to FIG. 1, the numeral 10 indicates a ballistic resistant article 10.

Article 10, as shown in FIG. 1, comprises two essential components. One essential component is a plurality of fibrous layers 12 comprising a network of high strength fibers useful high strength fibers include ballistic nylons fibers and fibers composed of extended chain polymers formed by polymerization of α,β-unsaturated monomers of the formula:

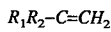

wherein:

$R_1$ and $R_2$ are the same or different and are hydrogen, hydroxy, halo, alkylcarbonyl, carboxy, alkoxycarbonyl, heterocycle or alkyl or aryl either unsubstituted or substituted with one or more substituents selected from the group consisting of alkoxy, cyano, hydroxy, alkyl and aryl. Illustrative of such polymers of α,β-unsaturated monomers are polymers including polystyrene, polyethylene, polypropylene, poly(1-octadence), polyisobutylene, poly(1-pentene), poly(2-methylstyrene), poly (4-methylstyrene), poly(1-hexene), poly(1-pentene), poly (4-methoxystrene), poly(5-methyl-1-hexene), poly (4-methylpentene), poly (1-butene), polyvinyl chloride, polybutylene, polyacrylonitrile, poly(m-ethyl pentene-1), poly(vinyl alcohol), poly(vinylacetate), poly(vinyl butyral), poly(vinyl chloride), poly(vinylidene chloride), vinyl chloride-vinyl acetate chloride copolymer, poly(vinylidene fluoride), poly(methyl acrylate, poly(methyl methacrylate), poly(methacrylo-nitrile), poly(acrylamide), poly(vinyl fluoride), poly(vinyl formal), poly(3-methyl-1-butene), poly(1-pentene), poly(4-methyl-1-butene), poly(1-pentene), poly(4-methyl-1-pentence, poly(1-hexane), poly(5-methyl-1-hexene), poly(1-octadence), poly(vinylcyclopentane), poly(vinylcyclohexane), poly(a-vinylnaphthalene), poly(vinyl methyl ether), poly(vinylethylether), poly(vinyl propylether), poly(vinyl carbazole), poly(vinyl pyrolidone), poly(2-chlorostyrene), poly(4-chlorostyrene), poly(vinyl formate), poly(vinyl butyl ether), poly(vinyl octyl ether), poly(vinyl methyl ketone), poly(methylisopropenyl ketone), poly(4-phenylstyrene) and the like.

Preferred fibers for use in the practice of this invention are those having a tenacity equal to or greater than about 10 g/d, a tensile modulus equal to or greater than about 150 g/d, and an energy-in-break equal to or greater than about 8 joules/gram. Particularly preferred fibers are those having a tenacity equal to or greater than about 20 grams/denier, a tensile modulus equal to or greater than about 500 grams/denier and energy-to-break equal to or greater than about 30 joules/grams. Amongst these particularly preferred embodiments, most preferred are those embodiments in which the tenacity of the fibers are equal to or greater than about 25 grams/denier, a tensile modulus equal to or greater than about 1000 g/denier and energy-to-break is equal to or greater than about 35 joules/gram. In the practice of this invention, fibers of choice have a tenacity equal to or greater than about 30 grams/denier, a tensile modulus equal to or greater than about 1500 grams/denier, and the energy-to-break is equal to or greater than about 40 joules/gram. All tensile properties are evaluated by pulling a 10 in. (25.4 cm) fiber length clamped in barrel clamps at a rate of 10 in/min (25.4 cm/min) on an Instron Tensile Tester.

In the most preferred embodiments of the invention, layer 12 is fabricated from relatively high molecular weight polyethylene fibers, high molecular weight polypropylene fibers, aramide fibers, high molecular weight polyvinyl alcohol fibers, high molecular weight polyacrylonitrile fibers or mixtures thereof. U.S. Pat. No. 4,457,985 generally discusses such high molecular weight polyethylene and polypropylene fibers, and the disclosure of this patent is hereby incorporated by reference to the extent that it is not inconsistent herewith. In the case of polyethylene, suitable fibers are those of molecular weight of at least about 150,000, preferably at least about 500,000, more preferably at least about one million and most preferably between about one million and about five million. Such extended chain polyethylene (ECPE) fibers may be grown in solution as described in U.S. Pat. No. 4,137,394 to Meihuzen et al., or U.S. Pat. No. 4,356,138 of Kavesh et al., issued Oct. 26, 1982, or fiber spun from a solution to form a gel structure, as described in German Off. 3,004,699 and GB 2051667, and especially described in U.S. Pat. No. 4,551,296 (see EPA 64,167, published Nov. 10, 1982). As used herein, the term polyethylene shall mean a predominantly linear polyethylene material that may contain minor amounts of chain branching or comonomers not exceeding about 5 (preferably not exceeding about 10 more preferably not exceeding about 5 modifying units per 100 main chain carbon atoms) modifying units per 100 main chain carbon atoms and that may also contain admixed therewith not more than about 50 wt % of one or more polymeric additives such as alkene-1-polymers, in particular low density polyethylene, polypropylene or polybutylene, copolymers containing mon-olefins as primary monomers, oxidized polyolefins, graft polyolefin copolymers and polyoxymethylenes, or low molecular weight additives such as anti-oxidants, lubricants, ultra-violet screening agents, colorants and the like which are commonly incorporated by reference. Depending upon the formation technique, the draw ratio and temperatures, and other conditions, a variety of properties can be imparted to these fibers. The tenacity of the fibers should be at least about 15 grams/denier (as measured by an Instron Testing Machine) preferably at least about 20 grams/denier, more preferably at least about 25 grams/denier and more preferably at least about 30 grams/denier. Similarly, the tensile modulus of the fibers, as measured by and Instron tensile testing machine, is at least about 300 grams/denier, preferably at least about 500 grams/denier and more preferably at least about 1,000 grams/denier and most preferably at least about 1,200 grams/denier. These highest values for tensile modulus and tenacity and generally obtainable only by employing solution grown or gel fiber processes.

Similarly, highly oriented polypropylene fibers of molecular weight at least about 200,000, preferably at least one million and more preferably at least two million may be used. Such high molecular weight polypropylene may be formed into reasonably well oriented by the techniques prescribed in the various references referred to above, and especially by the technique of U.S. Pat. No. 4,551,296. Since polypropylene is a much less crystalline material than polyethylene and contains pendant methyl groups, tenacity values achievable with polypropylene are generally substantially lower than the corresponding values for polyethylene. Accordingly, a suitable tenacity is at least about 8 grams/denier (as measured by an instron Tensile Testing Machine), with a preferred tenacity being at least about 11 grams/denier. The tensile modulus for polypropylene is at least about 160 grams/denier (as measured by an instron Tensile Testing Machine) preferably at least about 200 grams/denier. The particularly preferred ranges for the above-described parameters can advantageously provide improved performance in the final article.

High molecular weight polyvinyl alcohol fibers having high tensile modulus preferred for use in the fabrication of layer 12 are described in U.S. Pat. No. 4,440,711 which is hereby incorporated by reference to the extent it is not inconsistent herewith. In the case of polyvinyl alcohol (PV-OH), PV-OH fiber of molecular weight of at least about 200,000. Particularly useful PV-OH fiber should have a modulus of at least about 300 g/denier, a tenacity of at least about 7 g/denier (preferably at least about 10 g/denier, more preferably at about 14 g/denier, and most preferably at least about 17 g/denier), and an energy to break of at least about 8 joules/g. P(V-OH) fibers having a weight average molecular weight of at least about 200,000, a tenacity of at least about 10 g/denier, a modulus of at least about 300 g/denier, and an energy to break of about 8 joules/g are more useful in producing a ballistic resistant article. P(V-OH) fiber having such properties can be produced, for example, by the process disclosed in U.S. Pat. No. 4,599,267.

Article 10 also includes a plurality of second layers 14 which alternate with layers 12. The degree to which layers 12 and 14 alternate may vary widely depending on a number of factors such as the number and thickness of the layers, the thickness of the composite, the desired level of fire retarding and the like. In general, the greater the degree of alternation and the thinner the layers, the greater the fire retarding properties of the composite. Conversely, the lessor the degree of alternation and the thicker the layers, the lessor fire retarding properties of the composite. In the preferred embodiments, the alternation is such that each first layer is bounded on each side by a second layer. Second layers 14 are composed of a network of fibers which can pass the Torch Test (see the examples). The type of fibers used in the fabrication of layer 14 may vary widely. The only requirement is that the fibers are fire resistant. Preferably the fibers also exhibit ballistic resistant properties i.e. exhibit tenacity of at least about 7 g/denier, preferably at least about 10 g/denier, more preferably at least about 20 g/denier, most preferably at least about 25 g/denier; tensile modulus of at least about 150 g/denier, preferably at least about 500 grams/denier, more preferably at least about 1300 grams/denier, most preferably from about 1300 grams/denier to about 1300 grams from about 1300 g/denier to about 3000 g/d; and an energy break of at least about 8 joules/gram (J/g) preferably of least about 30 J/g, more preferably at least about 350 J/g and most preferably at least about 40 J/g. Useful fire resistant fibers may vary widely. For example, such fibers may be metallic fibers, semi-metallic fibers, inorganic fibers and/or organic fibers. Illustrative of useful organic fibers are those composed of aromatic polyesters, polyetheramides, fluoropolymers, polyethers, phenolics, polyesteramides, amimoplastics, silicones, polysulfones, polyetherketones, polyetherether-ketones, polyesterimides, polyphenylene sulfides, polyether acryl ketones, poly(amideimides), and polyimides. Illustrative of other useful organic fibers are those composed of aramids (aromatic polyamides), such as poly (metaphenylene isophthalamide) (Nomex) and poly (p-phenylene terephthalamide) (Kevlar); and the like; and aromatic polyesters such as poly(parahydroxy benzoate), and the like.

Also illustrative of useful organic fibers are those of liquid crystalline polymers such as lyrotropic liquid crystalline polymers which include aromatic polyamides such as poly(1,4-benzamide), poly(chloro-1,4-phenylene terephthalamide), poly(1,4-phenylene fumaramide), poly(chloro-1,4-phenylene fumaramide), poly(4,4'-benzanilide trans, trans-muconamide), poly(1,4-phenylene mesaconamide), poly(1,4-phenylene) (trans-1,4-cyclohexylene amide), poly-(chloro-1,4-phenylene) (trans-1,4-cyclohexylene amide), poly(1,4-phenylene 1,4-dimethyl-trans-1,4-cyclohexylene amide), poly(1,4-phenylene 2,5-pyridine amide), poly-(chloro-1,4-phenylene 2,5-pyridine amide), poly(3,3'-dimethyl-4,4'-biphenylene 2,5 pyridine amide), poly(1,4-phenylene 4,4'-stilbene amide), poly(chloro-1,4-phenylene 4,4'-stilbene amide), poly(1,4-phenylene 4,4'-azobenzene amide), poly(4,4'-azobenzene 4,4'-azobenzene amide), poly(1,4-phenylene 4,4'-azoxybenzene amide), poly(4,4'-azobenzene 4,4'-azoxybenzene amide), poly(1,4-cyclohexylene 4,4'-azobenzene amide), poly(4,4'-azobenzene terephthal amide), poly(3,8-phenanthridinone terephthal amide), poly(4,4'-biphenylene terephthal amide), poly(4,4'-biphenylene 4,4'-bibenzo amide), poly(1,4-phenylene 4,4'-bibenzo amide), poly(1,4-phenylene 4,4'-terephenylene amide), poly(1,4-phenylene 2,6-naphthal amide), poly(1,5-naphthylene terephthal amide), poly(3,3'-dimethyl-4,4-biphenylene terephthal amide), poly(3,3'-dimethoxy-4,4'-biphenylene terephthal amide), poly(3,3'-dimethoxy-4,4-biphenylene 4,4'-bibenzo amide) and the like; polyoxamides such as those derived from 2,2-dimethyl-4,4-diamino biphenyl and chloro-1,4-phenylene diamine; polyhydrazides such as poly (chloroterephthalic hydrazide), 2,5-pyridine dicarboxylic acid hydrazide) poly(terephthalic hydrazide), poly-(terephthalic-chloroterephthalic hydrazide) and the like; poly(amidehydrazides) such as poly(terephthaloyl 1,4-aminobenzhydrazide) and those prepared from 4-aminobenzhydrazide, oxalic dihydrazide, terephthalic dihydrazide and para-aromatic diacid chlorides; polyesters such as those of the compositions include poly(oxy-trans-1,4-cyclohexyleneoxycarbonyl-trans-1,4-cyclohexylenecarbonyl α-β-oxy-1,4-phenyl-eneoxyterephthaloyl) and poly(oxy-cis- 1,4-cyclohexyleneoxycarbonyl-trans-1,4-cyclohexylenecarbonyl α-β-oxy-1,4-phenyleneoxyterephthaloyl) in methylene chloride-o-cresol poly[(oxy-trans-1,4-cyclohexylene-oxycarbonyl-trans-1,4-cyclohexylenecarbonyl-β-oxy-(2-methyl- 1,4-phenylene)oxy-terephthaloyl)] in 1,1,2,2-tetrachloro-ethane-o-chlorophenol-phenol (60:25:15 vol/vol/vol), poly[oxy-trans-1,4-cyclohexyleneoxycarbonyl-trans-1, 4-cyclohexylenecarbonyl-b-oxy( 2-methyl-1,3-phenylene)oxyterephthaloyl] in o-chlorophenol and the like; polyazomethines such as those prepared from 4,4'-diaminobenzanilide and terephthalaldephide, methyl-1,4-phenylenediamine and terephthalaldelyde and the like; polyisocyanides such as poly( -phenyl ethyl isocyanide), poly(n-octyl isocyanide) and the like; polyisocyanates such as poly(n-alkyl isocyanates) as for example poly(n-butyl isocyanate), poly(n-hexyl isocyanate) and the like; lyrotropic crystalline polymers with heterocylic units such as poly(1,4-phenylene-2,6-benzobisthiazole)(PBT), poly(1,4-phenylene-2,6-benzobisoxazole)(PBO), poly(1,4-phenylene-1,3,4-oxadiazole), poly(1,4-phenylene-2,6-benzobisimidazole), poly[2,5(6)-benzimidazole] (AB-PBI), poly[2,6-(1,4-phneylene)-4-phenylquinoline], poly[1,1'-(4,4'-biphenylene)- 6,6'-bis(4-phenylquinoline)] and the like; polyorganophosphazines such as polyphosphazine, polybisphenoxyphosphazine, poly[bis(2,2,2'-trifluoroethyelene) phosphazine] and the like; metal polymers such as those derived by condensation of trans-bis(tri-n-butylphosphine-)platinum dichloride with a bisacetylene or trans-bis(tri-n-butylphosphine)bis(1,4-butadinynyl)platinum and similar combinations in the presence of cuprous iodine and an amide; thermotropic copolyesters as for example copolymers of 6-hydroxy-2-naphthoic acid and p-hydroxy benzoic acid, copolymers of 6-hydroxy-2-naphthoic acid, terephthalic acid and hydroquinone and copolymers of poly(ethylene terephthalate) and p-hydroxybenzoic acid; and thermotropic copoly(amide-esters).

Illustrative of useful inorganic fibers for use in the fabrication of layer 14 are glass fibers such as fibers formed from quartz, magnesia aluminosilicate, non-alkaline aluminoborosilicate, soda borosilicate, soda silicate, soda lime-aluminosilicate, lead silicate, non-alkaline lead boroalumina, non-alkaline barium boroalumina, non-alkaline zinc boroalumina, non-alkaline iron aluminosilicate, cadmium borate, alumina fibers which include "saffil" fiber in eta, delta, and theta phase form, asbestos, boron, silicone carbide, graphite and carbon such as those derived from the carbonization of polyethylene, polyvinylalcohol, saras, polyamide (Nomex®) type, nylon, polybenzimidazole, polyoxadiazole, polyphenylene, PPR, petroleum and coal pitches (isotropic), mesophase pitch, cellulose and polyacrylonitrile, ceramic fibers such as those of boron carbide, zirconium carbide, beryllium carbide, silicon nitride, titanium nitride, silicon boride, aluminum nitride and metal fibers such as nickel, steel, aluminum and aluminum alloys.

In the preferred embodiments of this invention, useful fibers are glass fibers preferably E-glass, S-glass and fibers formed from poly(metaphenylene isophthalamide) fibers produced commercially by Dupont under the trade name Nomex®.

Layers 12 and 14 are formed of fibers arranged in networks which can have various configurations. For example, a plurality of fibers in the networks can be grouped together to form a twisted or untwisted yarn in various alignments. The fibers or yarn may be formed as a feltted, knitted or woven (plain, basket, sating and crow feet weaves, etc.) into a network, or formed into a network by any of a variety of conventional techniques. In the preferred embodiments of the invention, the fibers are untwisted mono-fiber yarn wherein the fibers are parallel, unidirectionally aligned. For example, the fibers may also be formed into nonwoven cloth layers be convention techniques.

In the most preferred embodiments of this invention, each of layers 12 and 14 is composed of one or more layers of continuous fibers embedded in a continuous phase of a matrix material which preferably substantially coats each fiber contained in the bundle of fibers. The manner in which the fibers are dispersed may vary widely. The fibers may be aligned in a substantially parallel, unidirectional fashion, or fibers may be aligned in a multidirectional fashion, or with fibers at varying angles with each other. In preferred embodiments of this invention, fibers in each layer forming layers 12 and 14 are aligned in a substantially parallel, unidirectional fashion such as in a prepreg, pultruded sheet and the like. Two or more of these mono-layers can be used to form layers 12 and 14 which are composed of multiple layers of coated unidirectional fibers in which each layer forming multi layers 12 and 14 are rotated with respect to its adjacent layers. For example each of layers 12 and 14 can be composed of a number of monolayers in which the second, third, fourth and fifth are layers rotated +45°, −45°, 90° and 0° with respect to the first layer, but not necessarily in that order. Other examples include a layers 12 and 14 with a 0°/90° layout of yarn or fibers which is a particularly preferred alignment.

In those instances where the fibers contained in layer 12 and 14 are polymeric materials, wetting and adhesion of fibers in the polymer or matrices, is enhanced by prior treatment of the surface of the fibers. The method of surface treatment may be chemical, physical or a combination of chemical and physical actions. Examples of purely chemical treatments are used of $SO_3$ or chlorosulfonic acid. Examples of combined chemical and physical treatments are corona discharge treatment or plasma treatment using one of several commonly available machines.

In layers 12 and 14, the fibers are dispersed or embedded in a matrix material. The type of matrix material may vary widely, and usually depend on the type of material used to form the embedded or dispersed fibers. For example, in those instances where the fibers are formed form polymeric materials, glass, or inorganic materials such as carbon or boron, the matrix can be a polymeric material such as a thermosetting or thermoplastic resin or a combination thereof. On the other hand, in those instances where the fibers are formed from a ceramic material, matrix materials can be a polymeric material and in addition can be a metallic material.

The matrix material used in the formation of layers 12 and 14 may vary widely. Illustrative of use for matrix materials are thermoplastic polymers such as polyetherimides, polyestercarbonate, polyesters, polyamides, polyethersulfones, polyurethanes, polyolefins, polydienes, polydiene olefins, polycarbonates, polyimides, polyphenyleneoxides, polyurethane elastomers, polyesterimides, poly(imide amides), polylactones, polyether ketones, polyestercarbonates, polyphenylene sulfides, polyether ether ketones, and the like; thermosetting resins such as epoxy resins, phenolic resins, vinyl ester resins, modified phenolic resins, unsaturated polyester, alllic resins, alkyd resins, urethanes and melamine urea resins and the like; polymer alloys and blends of thermoplastic and/or thermosetting resins; and interpenetrating polymer networks such as those of polycyanatopolyol such as dicyanoester bisphenol A and a thermoplastic resin such as a polysulfone. Suitable matrix materials also include metals such as nickel, manganese, tungsten, magnesium, titanium, aluminum and steel and alloys such as manganese alloys, nickel alloys, and aluminum alloys. In the preferred embodiments of the invention, the fibers are formed of an polymeric material or glass and the matrix material is a polymer.

One preferred polymeric matrix material for use in the fabrication of layer 12 is a mixture or blend of one or more thermosetting resins such as a vinyl ester resin and one or more thermoplastic resins such as a thermoplastic polyurethane.

Another preferred polymeric matrix material for use in the fabrication of layer 12 is a low modulus elastomeric material. A wide variety of elastomeric materials and formulation may be utilized in the preferred embodiments of this invention. Representative examples of suitable elastomeric materials for use in the formation of the matrix are those which have their structures, properties, and formulation together with cross-linking procedures summarized in the Encyclopedia of Polymer Science, Volume 5 in the section Elastomers-Synthetic (John Wiley & Sons Inc., 1964). For example, any of the following elastomeric materials may be employed: polybutadiene, polyisoprene, natural rubber, ethylene-propylene copolymers, ethylene-propylene-dien terpolymers, polysulfide polymers, polyurethane elastomers, chlorosulfonated polyethylene, polychloroprene, plasticized polyvinylchloride using dioctyl phthate or other plasticers well known in the art, butadiene acrylonitrile elastomers, poly(isobutylene-co-isoprene), polyacrylates, polyesters, unsaturated polyesters, vinyl esters, polyethers, fluoroelastomers, silicone elastomers, thermoplastic elastomers, and copolymers of ethylene.

Particularly useful elastomers are polysulfide polymers, polyurethane elastomers, unsaturated polyesters vinyl esters; and block copolymers of conjugated dienes such as butadiene and isoprene are vinyl aromatic monomers such as styrene, vinyl toluene and t-butyl styrene are preferred conjugated aromatic monomers. Block copolymers incorporating polyisoprene may be hydrogenated to produce thermoplastic elastomers having saturated hydrocarbon elastomer segments. The polymers may be simple tri-block copolymers of the type A-B-A, multiblock copolymers of the type (AB)n (n=2–10) or radial configuration copolymers of the type R-(BA)x (x=3–150); wherein A is a block from a polyvinyl aromatic monomer and B is a block from a conjugated dien elastomer. Many of these polymers are produced commercially by the Shell Chemical Co. and described in the bulletin "Kraton Thermoplastic Rubber" SC-68-81.

Most preferably, the elastomeric matrix material consists essentially of at least one of the above-mentioned elastomers. The low modulus elastomeric matrixes may also include fillers such as carbon black, glass microballons, and the like up to an amount preferably not to exceed about 250% by volume of the elastomeric material, more preferably not to exceed about 100% by volume and most preferably not to exceed about 50% by volume. The matrix material may be extended with oils, may include fire retardants such as halogenated paraffins, and vulcanized by sulfur, peroxide, metal oxide, or radiation cure systems using methods well known to rubber technologists. Blends of different elastomeric materials may be blended with one or more thermoplastics. High density, low density, and linear low density polyethylene may be cross-linked to obtain a matrix material of appropriate properties, either alone or as blends. In every instance, the modulus of the elastomeric matrix material should not exceed about 6,000 psi (41,300 kpa), preferably is less than about 5,000 psi (34,500 kpa), more preferably is less than 500 psi (3450 kpa).

In the preferred embodiments of the invention, the matrix material is a low modulus, elastomeric material has a tensile modulus, measured at about 23 C, of less than about 7,000 psi (41,300 kpa). Preferably, the tensile modulus of the elastomeric material is less than about 5,000 psi (34,500 kpa), more preferably, is less than 1,000 psi (6900 kpa) and most preferably is less than about 500 psi (3,450 kpa) to provide even more improved performance. The glass transition temperature (Tg) of the elastomeric material (as evidenced by a sudden drop in the ductility and elasticity of the material) is less than about 0° C. Preferable, the Tg of the elastomeric material is less than about −40° C. and more preferably is less than about −50° C. The elastomeric material also has an elongation to break of at least about 50%. Preferably, the elongation to break of the elastomeric material is at least about 300%.

The preferred matrix for use in the fabrication of layer 14 is a rigid thermosetting and/or thermoplastic material. The most preferred matrix material is a blend of one or more thermoplastic materials such as a thermoplastic polyurethane and one or more thermosetting resins such as an epoxy or phenolic resin.

The proportions of matrix to fiber in layers 12 and 14 may vary widely depending on a number of factors including, whether the matrix material has any ballistic-resistant properties of its own (which is generally not the case) and upon the rigidity, shape, heat resistance, wear resistance, fire resistance and other properties desired for layers 12 and 14. In general, the proportion of matrix to fiber in layer 14 may vary from relatively small amounts where the amount of matrix is about 10% by volume of the fibers to relatively large amount where the amount of matrix is up to about 90% by volume of the fibers. In the preferred embodiments of this invention, matrix amounts of from about 15 to about 80% by volume are employed. All volume percents are based on the total volume of layers 12 and 14. In the particularly preferred embodiments of the invention, ballistic-resistant articles of the present invention, layers 12 and 14 contain a relatively minor proportion of the matrix (e.g., about 10 to about 30% by volume of composite), since the ballistic-resistant properties are almost entirely attributable to the fibers, and in the particularly preferred embodiments of the invention, the proportion of the matrix in layers 12 and 14 is from about 10 to about 30% by weight of fibers.

Layers 12 and 14 can be prepared employing conventional procedures. For example, in those embodiments of the invention in which layer 12 comprises inorganic fibers such as silicon carbide in a metallic matrix, layer 12 can be formed by conventional metal working techniques. For example, a layer 14 comprised of a aluminum alloy matrix such as aluminum alloy 1000 series and a ceramic material such as silicone carbide can be conveniently prepared by the procedures described in Modern Composite Materials, by L. J. Broutmon and R. H. knock, Addison-Wesley Publishing Company.

In those embodiments of the invention in which layers 12 and 14 are comprised of polymeric fibers or glass fibers in a polymeric matrix can be prepared by conventional procedures for preparing composites having continuous and short fiber reinforcement. For example, in those embodiments of the invention which layers 12 and 14 are a woven fabric, layers 12 and 14 can be fabricated using conventional fabric weaving techniques of the type commonly employed for ballistic purposes such as a plain weave or a Panama weave. In those embodiments of the invention in which layers 12 and 14 is a network of fibers in a matrix, layers 12 and 14 are formed by continuing the combination of fibers and matrix material in the desired configurations and amounts, and then subjecting the combination to heat and pressure.

For extended chain polyethylene fibers, molding temperatures range from about 20° to about 150° C., preferably from about 80° to about 145° C., more preferably from about 100° to about 135° C., and more preferably from about 110° to about 130° C. The pressure may range from about 10 psi (69 kpa) to about 10,000 psi (69,000 kpa). A pressure between about 10 psi (69 kpa) and about 100 psi (690 kpa), when combined with temperatures below about 100° C. for a period of time less than about 1.0 min., may be used simply to cause adjacent fibers to stick together. Pressures from about 100 psi to about 10,000 psi (69,000 kpa), when coupled with temperatures in the range of about 100° to about 155° C. for a time of between about 1 to about 5 min., may cause the fibers to deform and to compress together (generally in a film-like shape). Pressures from about 100 psi (690 kpa) to about 10,000 psi (69,000 kpa), when coupled with temperatures in the range of about 150° to about 155° C. for a time of between 1 to about 5 min., may cause the film to become translucent or transparent. For polypropylene fibers, the upper limitation of the temperature range would be about 10° to about 20° C. higher than for ECPE fiber.

In the preferred embodiments of the invention, the fibers (pre-molded if desired) are pre-coated with the desired matrix material prior to being arranged in a network and molded into layers 12 and 14 as described above. The coating may be applied to the fibers in a variety of ways and any method known to those of skill in the art for coating fibers may be used. For example, one method is to apply the matrix material to the stretched high modulus fibers either as a liquid, a sticky solid or particles in suspension, or as fluidized bed. Alternatively, the matrix material may be applied as a solution or emulsion in a suitable solvent which does not adversely affect the properties of the fiber at the temperature of application. In these illustrative embodiments, any liquid may be used. However, in the preferred embodiments of the invention in which the matrix material is an elastomeric material, preferred groups of solvents include water, paraffin oils, ketones, alcohols, aromatic solvents or hydrocarbon solvents or mixtures thereof, with illustrative specific solvents including paraffin oil, xylene, toluene and octane. The techniques used to dissolve or disperse the matrix in the solvents will be those conventionally used for the coating of similar elastomeric materials on a variety of substrates. Other techniques for applying the coating to the fibers may be used, including coating of the high modulus precursor (gel fiber) before the high temperature stretching operation, either before or after removal of the solvent from the fiber. The fiber may then be stretched at elevated temperatures to produce the coated fibers. The gel fiber may be passed through a solution of the appropriate matrix material, as for example an elastomeric material dissolved in paraffin oil, or an aromatic oraliphatic solvent, under conditions to attain the desired coating. Crystallization of the polymer in the gel fiber may or may not have taken place before the fiber passes into the cooling solution. Alternatively, the fiber may be extruded into a fluidized bed of the appropriate matrix material in powder form.

The proportion of coating on the coated fibers or fabrics in layers 12 and 14 may vary from relatively small amounts of (e.g. 1% by volume of) to relatively large amounts (e.g. 150% by volume of), depending upon whether the coating material has any impact or ballistic-resistant properties of its own (which is generally not the case) and upon the rigidity, shape, heat resistance, wear resistance, fire resistance and other properties desired for the complex composite article. In general, layers 12 and 14 containing coated fibers should have a relatively minor proportion of coating (e.g. about 10 to about 30 percent by volume of fibers), since the ballistic-resistant properties of girdle 14 are almost entirely attributable to the fiber. Nevertheless, coated fibers with higher coating contents may be employed. Generally, however, when the coating constitutes greater than about 60% (by volume of fiber), the coated fiber is consolidated with similar coated fibers to form a fiber layer without the use of additional matrix material.

Furthermore, if the fiber achieves its final properties only after a stretching operation or other manipulative process, e.g. solvent exchanging, drying or the like, it is contemplated that the coating may be applied to a precursor material of the final fiber. In such cases, the desired and preferred tenacity, modulus and other properties of the fiber should be judged by continuing the manipulative process on the fiber precursor in a manner corresponding to that employed on the coated fiber precursor. Thus, for example, if the coating is applied to the xerogel fiber described in U.S. Pat. No. 4,551,296 and the coated xerogel fiber is then stretched under defined temperature and stretch ratio conditions, then the fiber tenacity and fiber modulus values would be measured on uncoated xerogel fiber which is similarly stretched.

It is a preferred aspect of the invention that each fiber be substantially coated with the matrix material for the production of layers 12 and 14. A fiber is substantially coated by using any of the coating processes described above or can be substantially coated by employing any other process capable of producing a fiber coated essentially to the same degree as a fiber coated by the processes described heretofore (e.g., by employing known high pressure molding techniques).

The fibers and networks produced therefrom are formed into "simple composites" as the precursor to preparing the complex composite articles of the present invention. The term, "simple composite" as used herein is intended to mean composites made up of one or more layers, each of the layers containing fibers as described above with a single major matrix material, which material may include minor proportions of other materials such as fillers, lubricants or the like as noted heretofore.

The proportion of elastomeric matrix material to fiber is variable for the simple composites, with matrix material amounts of from about 5% to about 150 vol %, by volume of the composite, representing the broad general range. Within this range, it is preferred to use composites having a relatively high fiber content, such as composites having only about 10 to about 50 vol % matrix material, by volume of the composite, and more preferably from about 10 to about 30 vol % matrix material by volume of the composite.

Stated another way, the fiber network occupies different proportions of the total volume of the simple composite. Preferably, however, the fiber network comprises at least about 20 volume percent of the simple composite. For ballistic protecting, the fiber network comprises at least about 50 volume percent, more preferably about 70 volume percent, and most preferably at least about 95 volume percent, with the matrix occupying the remaining volume.

A particularly effective technique for preparing a preferred composite of this invention comprised of substantially parallel, undirectionally aligned fibers includes the steps of pulling a fiber or bundles of fibers through a bath containing a solution of a matrix material preferably, an elastomeric matrix material, and circumferentially winding this fiber into a single sheet-like layer around and along a bundle of fibers the length of a suitable form, such as a cylinder. The solvent is then evaporated leaving a sheet-like layer of fibers embedded in a matrix that can be removed from the cylindrical form. Alternatively, a plurality of fibers or bundles of fibers can be simultaneously pulled through the bath containing a solution or dispersion of a matrix material and laid down in closely positioned, substantially parallel relation to one another on a suitable surface. Evaporation of the solvent leaves a sheet-like layer comprised of fibers which are coated with the matrix material and which are substantially parallel and aligned along a common fiber direction. The sheet is suitable for subsequent processing such as laminating to another sheet to form composites containing more than one layer.

Similarly, a yarn-type simple composite can be produced by pulling a group of fiber bundles through a dispersion or solution of the matrix material to substantially coat each of the individual fibers, and then evaporating the solvent to form the coated yarn. The yarn can then, for example, be employed to form fabrics, which in turn, can be used to form more complex composite structures. Moreover, the coated yarn can also be processed into a simple composite by employing conventional fiber winding techniques; for example, the simple composite can have coated yarn formed into overlapping fiber layers.

The number of layers of fibers included in layers 12 and 14 and the relative volumes and thickness of layers 12 and 14 may vary widely. In general, the greater the number of layers and the greater the % volume of thickness of layer 12, the greater the degree of ballistic protection provided and conversely, the lesser the number of layers and the lessor the % volume and thickness of layer 12, the lesser the degree of ballistic protection provided. Furthermore, the greater the % volume and thickness of layer 14, the greater the fire resistant properties of the ballistic article and conversely, the lower the % volume and thickness of layer 14, the lower the fire resistant properties of the ballistic article. Usually, the number of layers, and the relative % volume and thickness of layers 12 and 14 are selected to provide the desired degree of ballistic protection and fire resistance. In general, the number of layers 12 and 14 are at least about 2, the % volume of each of layers 12 and 14 is from about 5 to about 95 based on the total volume of layers 12 and 14 and the thicknesses of layers 12 and 14 are respectively from about 0.01 cm to about 2.5 cm and from about 0.02 to about 2.5 cm. In the preferred embodiments of the invention, the number of layers 12 and 14 are at least about 4, the % volume of each of layers 12 and 14 is from about 10 to about 90 based on the total volume of layers 12 an 14 and the thicknesses of layers 12 and 14 are respectively, from about 0.02 cm to about 5 cm and from about 0.02 to about 4 cm. In the more preferred embodiments of the invention, the number of layers 12 and 14 are at least about 6, the % volume of each of layers 12 and 14 is from about 20 to about 80 (respectively) based on the total volume of layers 12 and 14 and the thicknesses of layers 12 and 14 are, respectively, from about 0.05 cm to about 3 cm and from about 0.04 to about 4 cm. In the most preferred embodiments of the invention, the number of layers 12 and 14 are at least about 8, the % volume of each of layers 12 and 14 is from about 25 to about 75 based on the total volume of layers 12 and 14 and the thicknesses of layers 12 and 14 are, respectively, from about 0.1 cm to about 7 cm and from about 0.07 to about 4 cm.

One preferred configuration of layers 12 and 14 is a laminate in which one or more layers of fibers coated with matrix material (pre-molded if desired) are arranged in a sheet-like array and aligned parallel to one another along a common fiber direction. Successive layers of such coated unidirectional fibers can be rotated with respect to the previous layer after which the laminate can be molded under heat and pressure to form the laminate. An example of such a structure is one in which the second, third, fourth and fifth layer are rotated +45°, −45°, 90° and 0° with respect to the first layer, but not necessarily in that order. Similarly, another example of such layered layers 12 and 14 is a layered structure in which the various unidirectional layers are aligned such that the common fiber axis is adjacent layers is 0°, 90°.

Figure 2:
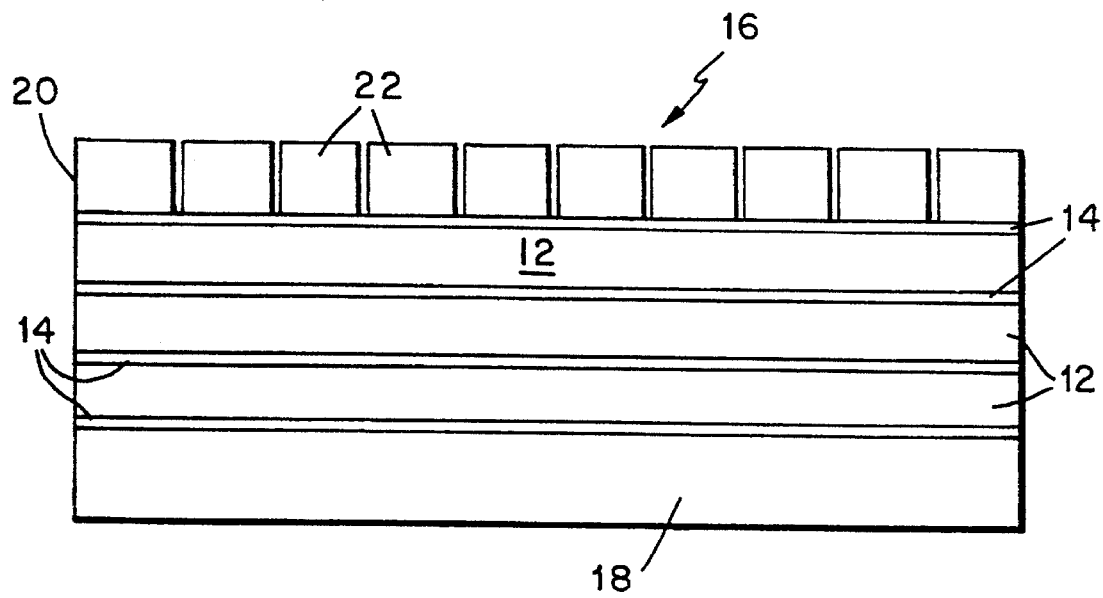
FIG. 2 is a prospective fragmentary view of another ballistic resistant article of this invention having a plurality of impact resistant bodies on a surface thereof.

The article of this invention may be fabricated into more complex ballistic articles. For example, FIG. 2 depicts such a complex article, indicated at 16 which in addition to alternating layers 12 and 14 includes a backing layer 18. Backing layer 18 is comprised of a rigid ballistic material which may vary widely depending on the uses of article 10, and may offer additional ballistic protection. The term "rigid" as used in the present specification and claims is intended to include semi-flexible and semi-rigid structures that are not capable of being free standing, without collapsing. The backing material employed may vary widely and may be metallic, semi-metallic material, an organic material and/or an inorganic material. Illustrative of such materials are those described in G. S. Brady and H. R. Clauser, *Materials Handbook,* 12th edition (1986). Materials useful for fabrication of backing layer 18 include high modulus polymeric materials such as polyamides as for example aramids, nylon-66, nylon-6 and the like; polyesters such as polyethylene terephthalate polybutylene terephthalate, and the like, acetal; polysulfones; polyethersulfones; polyacrylates; acrylonitrile/butadiene/styrene copolymers; poly(amideimide); polycarbonates; polyphenylenesulfides; polyurethanes, polyphenyleneoxides; polyester carbonates; polyesterimides; polyimides; polyetheretherketone; epoxy resins; phenolic resins; polysulfides; silicones; polyacrylates; polyacrylics; polydienes; vinyl ester resins; modified phenolic resins; unsaturated polyester; allylic resins; alkyd resins; melamine and urea resins; polymer alloys and blends of thermoplastics and/or thermosets of the materials described above; and interpenetrating polymer networks such as those of polycyanate ester of a polyol such as the dicyanoester of bisphenol-A and a thermoplastic such as a polysulfone. These materials may be reinforced by high strength fibers described above for use in the fabrication of layers 12 and 14 such as Kevlar® aramid fibers, Spectra® polyethylene fibers, boron fibers, glass fibers, ceramic fibers, carbon and graphite fibers, and the like.

Useful backing materials also include metals such as nickel, manganese, tungsten, magnesium, titanium, aluminum and steel plate. Illustrative of useful steels are carbon steels which include mild steels of grades AISI 1005 to AISI 1030, medium-carbon steels of grades AISI 1030 to AISI 1055, high-carbon steels of the grades AISI 1060 to AISI 1095, free-machining steels, low-temperature carbon steels, rail steel, and superplastic steels; high-speed steels such as tungsten steels, molybdenum steels, chromium steels, vanadium steels, and cobalt steels; hot-die steels; low-alloy steels; low-expansion alloys; mold-steel; nitriding steels for example those composed of low-and medium-carbon steels in combination with chromium and aluminum, or nickel, chromium, and aluminum; silicon steel such as transformer steel and silicon-manganese steel; ultrahigh-strength steels such as medium-carbon low alloy steels, chrominum-molybdenum steel, chromium-nickel-molybdenum steel, iron-chromium-molybdenum-cobalt steel, quenched-and-tempered steels, cold-worked high-carbon steel; and stainless steels such as iron-chromium alloys austenitic steels, and chromium-nickel austenitic stainless steels, and chromium-manganese steel. Useful materials also include alloys such as manganese alloys, such as manganese aluminum alloy, manganese bronze alloy; nickel alloys such as, nickel bronze, nickel cast iron alloy, nickel-chromium alloys, nickel-chromium steel alloys, nickel copper alloys, nickel-molydenum iron alloys, nickel-molybdenum steel alloys, nickel-silver alloys, nickel-steel alloys; iron-chromium-molybdenum-cobalt steel alloys; magnesium alloys; aluminum alloys such as those of aluminum alloy 1000 series of commercially pure aluminum, aluminum-manganese alloys of aluminum alloy 300 series, aluminum-magnesium-manganese alloys, aluminum-magnesium alloys, aluminum-copper alloys, aluminum-silicon-magnesium alloys of 6000 series, aluminum-copper-chromium of 7000 series, aluminum casting alloys; aluminum brass alloys and aluminum bronze alloys. Still other materials useful in the fabrication of backing layer 18 are the fiber composites used in the fabrication of vibration isolating layers 12 and 14 which comprises fibrous network in a rigid matrix. Yet, other materials useful in the fabrication of backing layer 16 are non-shattering glass such as bulletproof glass.

Composite 16 of FIG. 2 also includes a ceramic impact layer 20. A ceramic impact layer 20 is excellently suitable for blunting the tip of the projectile, particularly because the ceramic material forming layer 20 will retain its hardness and strength despite the high increase in temperature that will occur in the region struck by a projectile. Ceramic impact layer 20 comprises one or more ceramic bodies 22. In the preferred embodiments of the invention, layer 20 comprises a plurality of ceramic bodies 22, in the more preferred embodiments of the invention layer 20 comprises at least about four ceramic bodies 22 and in the most preferred embodiments, layer 20 comprises at least about nine ceramic bodies 22 with those embodiments in which the number of ceramic bodies 22 in layer 20 is at least about sixteen being the embodiment of choice.

Ceramic body 22 is formed of a ceramic material. As used herein, a "ceramic material" is an inorganic material having a hardness of at least about Brinell hardness of 25 or Mohs hardness of 2. Useful ceramic materials may vary widely and include those materials normally used in the fabrication of ceramic armor which function to partially deform the initial impact surface of a projectile or cause the projectile to shatter. Illustrative of such metal and non-metal ceramic materials are those described in C. F. Liable, *Ballistic Materials and Penetration Mechanics,* Chapters 5–7 (1980) and include single oxides such as aluminum oxide ($Al_2O_3$), barium oxide (BaO), beryllium oxide (BeO), calcium oxide (CaO), cerium oxide ($Ce_2O_3$ and $CeO_2$), chromium oxide ($Cr_2O_3$), dysprosium oxide ($Dy_2O_3$), erbium oxide ($Er_2O_3$), europium oxide (EuO, $Eu_2O_3$, $Eu_2O_4$ and $Eu_{16}O_{21}$), gadolinium oxide ($Gd_2O_3$), hafnium oxide ($HfO_2$), holmium oxide ($Ho_2O_3$), lanthanum oxide ($La_2O_3$), lutetium oxide ($Lu_2O_3$), magnesium oxide (MgO), neodymium oxide ($Nd_2O_3$), niobium oxide: (NbO, $Nb_2O_3$, and $NbO_2$), ($Nb_2O_5$), plutonium oxide (PuO, $Pu_2O_3$, and $PuO_2$), praseodymium oxide ($PrO_2$, $Pr_6O_{11}$, and $Pr_2O_3$), promethium oxide ($Pm_2O_3$), samarium oxide (SmO and $Sm_2O_3$), scandium oxide ($Sc_2O_3$), silicon dioxide ($SiO_2$), strontium oxide (SrO), tantalum oxide ($Ta_2O_5$), terbium oxide ($Tb_2O_3$ and $Tb_4O_7$), thorium oxide ($ThO_2$), thulium oxide ($Tm_2O_3$), titanium oxide (TiO, $Ti_2O_3$, $Ti_3O_5$ and $TiO_2$), uranium oxide ($UO_2$, $U_3O_8$ and $UO_3$), vanadium oxide (VO, $V_2O_3$, $VO_2$ and $V_2O_5$), ytterbium oxide ($Yb_2O_3$), yttrium oxide ($Y_2O_3$), and zirconium oxide ($ZrO_2$). Useful ceramic materials also include boron carbide, zirconium carbide, beryllium carbide, aluminum beride, aluminum carbide, boron carbide, silicon carbide, aluminum carbide, titanium nitride, boron nitride, titanium carbide, titanium diboride, iron carbide, iron nitride, barium titanate, aluminum nitride, titanium niobate, boron carbide, silicon boride, barium titanate, silicon nitride, calcium titanate, tantalum carbide, graphites, tungsten; the ceramic alloys which include cordierite/MAS, lead zirconate titanate/PLZT, alumina-titanium carbide, alumina-zirconia, zirconia-cordierite/ZrMAS; the fiber reinforced ceramics and ceramic alloys; glassy ceramics; as well as other useful materials. Preferred materials for fabrication of ceramic body 12 are aluminum oxide and metal and non metal nitrides, borides and carbides. The most preferred material for fabrication of ceramic body 22 is aluminum oxide and titanium diboride.

The structure of ceramic body 22 can vary widely depending on the use of the article. For example, body 22 can be a unitary structure composed of one ceramic material or multilayer construction composed of layers of the same material or different ceramic materials.

While in the figure ceramic body 22 is depicted as a cubular solid, the shape of ceramic body 22 can vary widely depending on the use of the article. For example, ceramic body 22 can be an irregularly or a regularly shaped body. Illustrative of a useful ceramic body 22 are cubular, rectangular, cylindrical, and polygonal (such as triangular, pentagonal and hexagonal) shaped bodies. In the preferred embodiments of the invention, ceramic body 18 is of cubular, rectangular or cylindrical cross-section.

The size (width and height) of body 22 can also vary widely depending on the use of article 16. For example, in those instances where article 16 is intended for use in the fabrication of light ballistic resistant composites for use against light armaments, body 22 is generally smaller; conversely where article 16 is intended for use in the fabrication of heavy ballistic resistant composites for use against heavy armaments then body 22 is generally larger.

The amount of a surface of layers 12 and 14 covered by ceramic bodies 22 may vary widely. In general, the greater the area percent of the surface layers 12 and 14 covered or loaded, the more effective the protection, and conversely, the lower the area percent of the surface layers 12 and 14 covered the less effective the protection. In the preferred, embodiment of the invention, the area percent of the surface of layers 12 and 14 covered by ceramic bodies 22 is equal to or greater than about 95 area percent based on the total surface area of layers 12 and 14, and in the more preferred embodiments of the invention the area percent of surface covered is equal to or greater than about 97 area percent on the aforementioned basis. Amongst the more preferred embodiments of the invention, most preferred are those in which the areas percent of the surface of vibration isolating layer 14 covered by ceramic bodies 18 is equal to or greater than about 98 or 99 area percent based on the total surface area of layers 12 and 14.

Means for attaching ceramic bodies 22 to layers 12 and 14 may vary widely and may include any means normally used on the art to provide this function. Illustrative of useful attaching means are adhesive such as those described in Liable, Chapter 6, supra, bolts, screws, mechanical interlocks adhesives such as metal and non-metal adhesives, organic adhesives and the like. In the preferred embodiments of this invention attaching means is selected from the group consisting of flexible adhesive bonding agents. Such flexible bonding agents provide several useful functions. For example, such agents enhance structural performance such that the composite is capable of withstanding severe impact loads, and they enhance the retention of segmented tiles which are not at the point of impact and the retention of spall/particles created by the shattering of tiles on impact. Such adhesives also enhance the conversion of absorbed energy into heat. As used herein, a "flexible adhesive" is a polymeric adhesive which exhibits a Shore A Hardness of from about 20 to 100. In the preferred embodiments of the invention, the adhesive material is a low modulus, elastomeric material which has a tensile modulus, measured at about 23° C. of less than about 7,000 psi (41,300 kpa).

Preferably, the tensile modulus of the elastomeric material is less than about 5,000 psi (34,500 kpa), more preferably is less than 1,000 psi (6900 kpa) and most preferably is less than about 500 psi (3450 kpa) to provide even more improved performance. The glass transition temperature (Tg) of the elastomeric material (as evidenced by a sudden drop in the ductility and elasticity of the material) is less than about 0° C. Preferably, the Tg of the elastomeric material is less than about –40° C. and more preferably is less than about –50° C. The elastomeric material also has an elongation to break of at least about 5%. Preferably, the elongation to break of the elastomeric material is at least about 30%. Representative examples of suitable elastomeric materials for use as a flexible adhesive are those which have their structures, properties, and formulation together with cross-linking procedures summarized in the Encyclopedia of Polymer Science, Vol. 5 in the section Elastomers-Synthetic (John Wiley & sons Inc , 1964) and "Handbook of Adhesives" Van Nostrand Reinhold Company (1977), 2nd Ed., Edited by Irving Skeist. Illustrative of such materials are block copolymers of conjugated dienes such as butadiene and isoprene, and vinyl aromatic monomers such as styrene, vinyl toluene and t-butyl styrene; polydienes such as polybutadiene and polychloroprene, polyisoprene; natural rubber; copolymers and polymers of olefins and dienes such as ethylene-propylene copolymers, ethylene-propylene-diene terpolymers and poly(isobutylene-co-isoprene); and polysulfide polymers.

Complex ballistic articles of this invention have many uses. For example, such composites may be incorporated into more complex composites to provide a rigid complex composite article suitable, for example, as structural ballistic-resistant components, such as helmets, structural members of aircraft, and vehicle panels.

The following examples are presented to provide a more complete understanding of the invention. The specific techniques, conditions, materials, proportions and reported data set forth to illustrate the principles of the invention are exemplary and should not be construed as limiting the scope of the invention.

EXAMPLE I

Spectra® prepregs of 11" (27.94 cm)×11" (27.94 cm)× 0.39" (1.0 cm) were molded under a pressure of 500 psi (3445 kPa) and temp. of 125° C. for 15 minutes followed by a cooling cycle to 40° C. The composite panel was constructed from five plies of Spectra® prepregs (0°, 90° oriented uniaxial structure) with six layers of glass fabric prepregs as partition between two neighboring Spectra® prepregs and as exterior layers.

Spectra® uniaxial prepregs were prepared from Spectra®-100 fibers of 650 deniers/118 fibers impregnated with a coating mixture of Kraton® D-1107 resin which is a styrene-isoprene-styrene block copolymer. The resin is sold by Shell Chemical Company. The coating mixture comprised a homogeneous solution of 6% by weight Kraton® D-1107 and about 94% by weight of methylene chloride. The Spectra® prepregs were approx. 12" (30.48 cm) wide and contained 16 yarn-ends per inch (40.64 yarn ends per cm) prepreg-width. The uniaxial prepreg had a thickness of 0.0020" (0.0051 cm) and containing 75% by weight of Spectra® yarns and 25% by weight Kraton D-1107 matrix-resin. The prepreg layers were then cut into squares of 11" (27.94 cm)× 11" (27.94 cm) and were laid in alternating fashion 0°, 90°, 0°, 90°, to form a prepreg ply consisting of 30 layers with thickness of 0.0060" (0.0152 cm). The ply was then cold pressed under a pressure of 500 psi (3445 Pa) and temperature of 80° C. which is below the melting temperature of Kraton matrix-resin. A total of five plies were prepared and between neighboring ply was S-2 glass fabric impregnated with a flame retardant matrix-resin, style 6781, 8.9 oz/sq. yd. (0.33 Kg/m$^2$), manufactured by Clark Schwebel Corp. The resin consisted of Chlorowax®-70S and antimony tri-oxide in weight ratio of 2:1. Chlorowax® is registered tradename of White Chemical, Inc. The glass fabric prepreg of 0.015" (0.0381 cm) consisted of 65% by weight of glass fabric and 35% by weight of flame retardant resin (Chlorowax and antimony tri-oxide).

The molded composite panel was Torch Tested. In this test, a horizontally held sample is exposed to the blue flame, or blue cone of the flame from a propane cylinder. The time exposure depends on the applications of the composite. After exposure of the composite to the flame for a certain time interval, observations are made regarding the sample weight loss, self extinguishing time of the flame, burning, depth of flame penetration, smoke and/or toxic gases generation. The blue cone of flame, measured at a temp. of 1,350° C. from a propane cylinder hit the panel surface perpendicularly for 30 seconds. The flame was quickly removed away from the panel and, upon close examination of the panel, no flame was observed and the panel surface was slightly charred. The experiment was repeated and the panel was subjected to the blue cone of the flame for an additional 30 seconds, or a total of 60 seconds, no flame was observed on the panel surface. The weight loss of the panel was less than 1% by weight.

EXAMPLE II

Example I was repeated except that the panel was constructed from two layers of glass fabric prepregs as exterior surfaces and six plies of Spectra® prepregs as the core. The panel, approximately 11" (27.94 cm)× 11" (27.94 cm)×0.40" (1.02 cm), was subjected to Torch Test for 60 seconds. After removal of the blue cone flame from the panel, surface flame was observed on the panel for about 2 seconds before it extinguished. The weight loss of the panel was 0.9% by weight.

EXAMPLE III

Example I was repeated except that the six glass fabric prepreg layers were replaced by six Kevlar-129 fabric prepregs layers. Yarns used in the fabrication of the prepreg layers are produced commercially by DuPont Corp. The Kevlar-129 fabric prepreg layers were, 30× 30 plain weave and contained approximately 35% by weight flame retardant (Chlorowax and antimony trioxide) and 65% Kevlar-129 yarns by weight. The molded composite panel which measured 11" (27.94 cm)×11" (27.94 cm)×0.41" (1.04 cm), was subjected to Torch Test for 60 seconds. After removal of the flame from the panel surface, the panel continued to burn for 3 seconds before self-extinguishing.

EXAMPLE IV

Example II was repeated except that two exterior layers of glass fabric prepregs were replaced by two layers of Kevlar-129 fabric prepregs layers. The composite panel measured 11" (27.94 cm)×11" (27.94 cm)×0.42" (1.07 cm). The panel was subjected to the Torch Test. After removal of the flame from the panel, the panel continue to burn for about 20 seconds before self extinguishing.

What is claimed is:

1. A fire resistant complex multilayer ballistic resistant article comprising a plurality of alternating first and second plies, wherein said first ply comprises one or more first layers comprising a network of flammable polymeric fibers in a first matrix, said fibers having a tenacity of at least about 7 g/denier, a tensile modulus of at least about 160 g/denier and an energy-to-break of at least about 8 joules/grams; and said second ply comprises one or more second layers comprising a network of fire resistant organic or inorganic fibers in a second matrix material wherein said second matrix material is a fire retardant material and is different from said first matrix material.

2. An article as recited in claim 1 wherein said first layer comprises a network of fibers having a tenacity of at least about 10 grams/denier, a tensile modulus of at least 300 grams/denier and an energy-to-break of at least about 20 joules/gram.

3. An article as recited in claim 2 wherein the fibers have a tenacity equal to or greater than about 20 g/d, a tensile modulus equal to or greater than about 1000 g/d and an energy-to-break equal to or greater than about 30 j/g.

4. An article as recited in claim 3 wherein said tenacity is equal to or greater than about 25 g/d, said modulus is equal to or greater than about 1300 g/d, and said energy-to-break is equal to or greater than about 25 j/g.

5. An article as recited in claim 1 wherein said flammable fibers are selected from the group consisting of nylon fibers and polyolefin fibers.

6. An article as recited in claim 1 wherein said flammable fibers are selected from the group consisting of polyethylene fibers, nylon fibers and mixtures thereof.

7. An article as recited in claim 6 wherein said fibers are polyethylene fibers.

8. An article as recited in claim 6 wherein said fibers are a mixture of polyethylene and nylon fibers.

9. An article as recited in claim 1 wherein said first layer comprises at least one sheet-like fiber array in which said fibers are arranged substantially parallel to one another along a common fiber direction.

10. An article as recited in claim 9 wherein said first layer comprises more than one array, with adjacent arrays aligned at an angle with respect to the longitudinal axis of the parallel fibers contained in said adjacent array.

11. An article as recited in claim 10 wherein said angle is from about 45° to about 90°.

12. An article as recited in claim 11 wherein said angle is about 90°.

13. An article as recited in claim 1 wherein said first layer comprises a non-woven fabric.

14. An article as recited in claim 1 wherein said second layer is a fibrous layer comprising a network of high strength fibers having a tensile strength of at least about 10 grams/denier, a tensile modulus of at least about 500 grams/denier and an energy-to-break of at least about 20 joules/gram in a matrix.

15. An article as recited in claim 14 wherein the fibers have a tenacity equal to or greater than about 20 g/d, a tensile modulus equal to or greater than about 1000 g/d and an energy-to-break equal to or greater than 30 j/g.

16. An article as recited in claim 15 wherein said tenacity is equal to or greater than about 25 g/d, said modulus is equal to or greater than about 1300 g/d, and said energy-to-break is equal to or greater than about 35 j/g.

17. An article as recited in claim 5 wherein said fire resistant fibers are glass fibers.

18. An article as recited in claim 17 wherein said flammable fibers are polyethylene fibers.

19. An article as recited in claim 17 wherein said first layer comprises at least one sheet-like fiber array in which said fibers are arranged substantially parallel to one another along a common fiber direction.

20. An article as recited in claim 17 wherein said first layer comprises more than one array, with adjacent arrays aligned at an angle with respect to the longitudinal axis of the parallel fibers contained in said adjacent array.

21. An article as recited in claim 6 wherein said first layer comprises at least one sheet-like fiber array in which said fibers are arranged substantially parallel to one another along a common fiber direction.

22. An article as recited in claim 21 wherein said first layer comprises more than one array, with adjacent arrays aligned at an angle with respect to the longitudinal axis of the parallel fibers contained in said adjacent array.

23. An article as recited in claim 22 wherein said angle is from about 45° to about 90°.

24. An article as recited in claim 23 wherein said angle is about 90°.

25. An article as recited in claim 5 wherein said second layer comprises a non-woven fabric in a matrix.

26. An article as recited in claim 22 which further comprises a plurality of planar bodies formed from a ceramic, a polymeric composite, a metal, a multilayered fiber composite or a combination thereof on a surface of said article.

27. An article as recited in claim 5 wherein said fire resistant fibers are inorganic fibers.

28. A fire resistant complex multilayer ballistic resistant article comprising alternating first and second plies wherein said first ply comprises one or more first layers each of said layers comprising a network of polyethylene fibers having a tenacity of at least about 7 g/denier, a tensile modulus of at least about 160 g/denier and an energy-to-break of at least about 8 joules/grams dispersed in a polymeric matrix, said first layer comprises two or more sheet-like fiber arrays in which said fibers are arranged substantially parallel to one another along a common fiber direction wherein adjacent arrays are aligned at an angle with respect to the longitudinal axis of the parallel fibers contained in said adjacent array, and said second ply comprising one or more second layers comprising a network of glass fibers in a fire retardant matrix material.

29. An article as recited in claim 28 wherein said angle is from about 45° to about 90°.

30. An article as recited in claim 28 wherein each of said second layers consists essentially of a network of glass fibers in a fire retardant matrix material.

31. An article as recited in claim 1 wherein each of said second layers consists essentially of a network of fire resistant organic or inorganic fibers in a fire retardant matrix material.

* * * * *